April 9, 1946. H. S. SINES Re. 22,743
PRECISION SQUEEZER YOKE
Original Filed Dec. 8, 1943
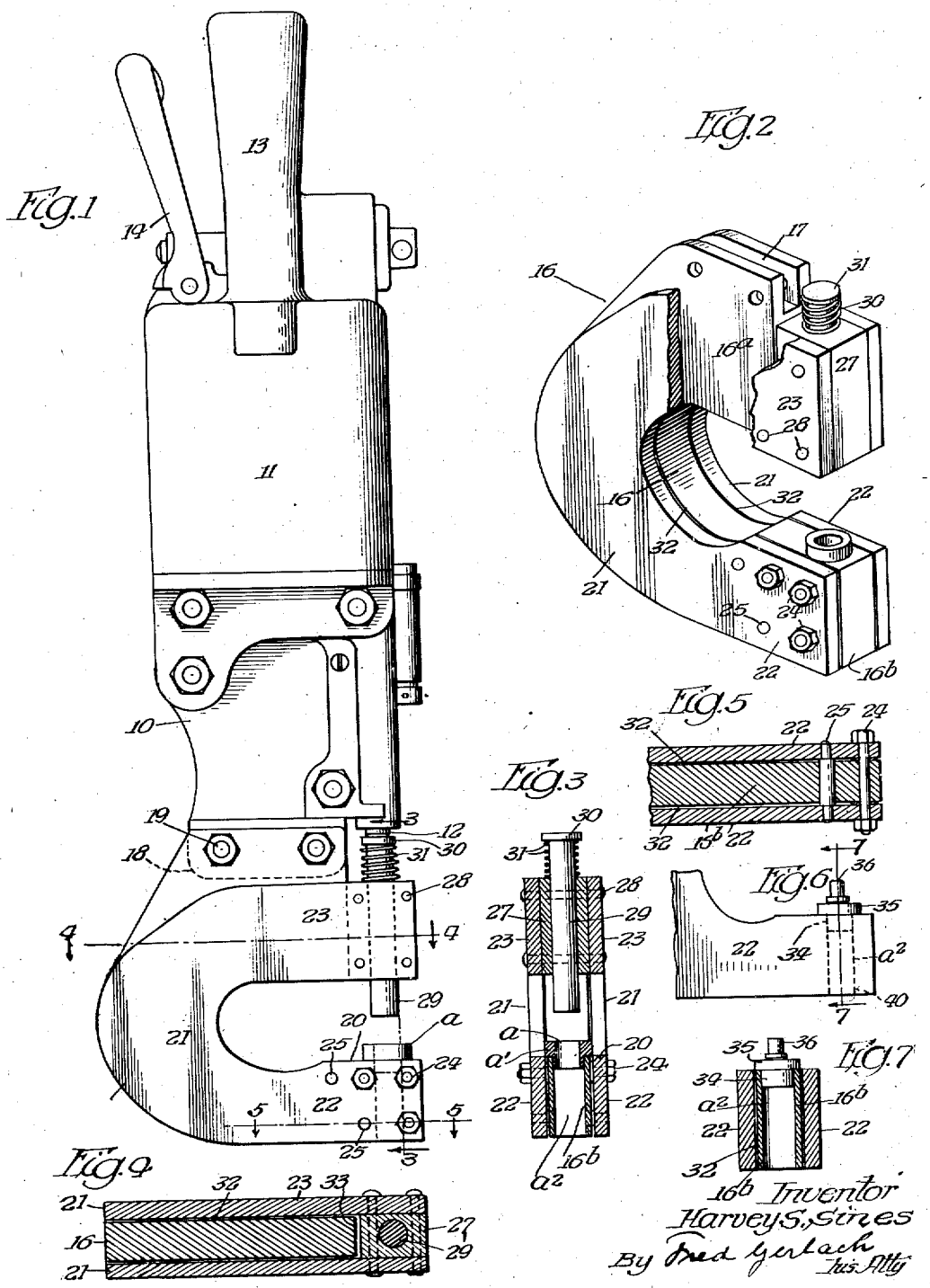

Reissued Apr. 9, 1946

Re. 22,743

UNITED STATES PATENT OFFICE 22,743

PRECISION SQUEEZER YOKE

Harvey S. Sines, Montebello, Calif., assignor to Consolidated Vultee Aircraft Corporation, San Diego, Calif., a corporation of Delaware Original No. 2,375,445, dated May 8, 1945, Serial No. 513,414, December 8, 1943. Application for reissue January 10, 1946, Serial No. 640,162

9 Claims. (Cl. 164—86)

The invention relates to pressure operated tools.

Portable tools now in common use comprise a frame equipped with power means, such for example as a cylinder and a piston, for the operation by pressure of a ram or tool which is slidably guided in the frame and a thrust-receiving bracket with a device, such as a socket die, for the punch or an anvil for a riveting tool. In the operation of these devices, the compression forces of the ram transmitted to the opposed thrust-receiving bracket, for the socket die when metal is to be pierced or the anvil when a rivet is to be upset, frequently cause bending in or deflection of the bracket. This deflection causes the relationship of the normally coaxial punching tool and the socket to be changed, or angular variation between the normally parallel opposed compression faces on the tool and the die or anvil. This results in lack of precision in punching or irregular upsetting in riveting and frequently results in injury to the ram. In piercing holes where precision is necessary, it is important to maintain parallelism of the opposed compression faces and the co-axial relation of the punch and socket or die in order to insure regularity and the true or desired axes of the holes punched in the work.

One object of the invention is to provide an improved tool of this type in which the power operated ram or tool and the coacting thrust-receiving devices, such as a socket or anvil, are rigidly connected by a yoke which is supported at the end of the thrust-receiving bracket and supports the ram at its other end so that any bending in or deflection of the bracket, produced by pressure from the ram, will maintain the opposed compression faces in normally parallel, or the punch and the socket-die in normally coaxial, relation.

Another object of the invention is to provide a precision yoke-structure which may be used as an attachment to the frames of power units.

Another object of the invention is to provide a portable punching device in which the punch and socket-die are conjointly movable by a rigid yoke so that their compression faces and axial relation will be maintained notwithstanding any deflection of or bending in the thrust-receiving yoke-supporting bracket during the punching operation.

Another object of the invention is to provide a pressure operable riveting tool in which the ram and the anvil are supported by a rigid yoke which is adapted to receive the work and which is supported from a bracket in such a manner that any deflection of or bending in the bracket by the compression forces during the riveting operation will not vary the normal relationship between the opposed compression faces on the anvil and the ram.

Other objects of the invention will appear from the detailed description.

The invention consists in the several novel features hereinafter set forth and more particularly defined by claims at the conclusion hereof.

In the drawing:

Fig. 1 is a side elevation of a power unit equipped with a device embodying the invention.

Fig. 2 is a perspective, parts being broken away, of the supporting bracket which is attached to the frame of the power unit and is provided with an arm for receiving thrust through a socket-die and the yoke for supporting the ram from the thrust-receiving end of the supporting bracket.

Fig. 3 is a section taken on line 3—3 of Fig. 1.

Fig. 4 is a section taken on line 4—4 of Fig. 1.

Fig. 5 is a section taken on line 5—5 of Fig. 1.

Fig. 6 is a side elevation of a modified form of the invention.

Fig. 7 is a section taken on line 7—7 of Fig. 6.

The invention is exemplified in a portable unit which comprises a casing or frame 10 for power-means, such as a piston (not shown) operable by compressed air in a cylinder 11 for operating a stem 12 which is slidably mounted in the frame 10 and adapted to shift a ram 29. The unit also comprises a handle 13 and a throttle-lever 14 for manually controlling the operation of the power-means for the operation of the stem 12, all of which may be of any suitable construction. In Figs. 1 to 5, the unit is exemplified as used for punching or piercing holes in a plate of metal and the ram 29 functions as a punching tool.

A generally C-shaped bracket 16 is adapted to extend around or receive the work, such as the plates to be punched or pierced and comprises an arm 16ᵃ on the side of the work at which the power-means is located, and an arm 16ᵇ extended to the opposite side of the work, the arms being integrally connected by the bend between them. The arm 16ᵃ is provided with a groove 17 for receiving a flange 18 which is rigid or integral with the frame 10 and bolts 19 extend through said flange and an extension on arm 16ᵃ of bracket 16 for rigidly attaching said arm to the frame 10 and supporting the bracket 16. The end of arm 16ᵇ functions as a thrust-receiving member on the side opposite the power side.

A pair of generally C-shaped rigid yokes 21 are disposed at the opposite sides of the bracket 16, respectively. Each yoke comprises a member or arm 22 which extends to the end of the thrust-receiving arm 16b of bracket 16 and a member or arm 23 which extends to the power or opposite side of the work. The ends of yoke-members 22 are rigidly secured by bolts 24 and dowel pins 25 to the end of arm 16b. The arm 16b thus functions to support the yokes at the side opposite the side of the work where the pressure is applied by the ram 29, from frame 10 at the opposite side of the work. A guide block 27 fits between the ends of yoke-members 23 and is fixedly secured to said members by rivets 28 or may be welded thereto so that the guide block and the ends of yoke-members 22 will be rigidly secured together and the guide block will be supported through the yokes from the thrust-receiving end of arm 16b of bracket 16. The ram 29 is slidably mounted in the guide block 27 for movement to and from the thrust-receiving arm 16b by pressure from the pneumatically operable stem 12 which is slidably mounted in the frame 10. A coil-spring 30 between the guide block 27 and a head 31 on the ram is adapted to retract the ram after a pressure stroke. The ram 29, guided in the block 27 at the power side of the work, is supported by the yokes 21 which are supported from the thrust-receiving end of the arm 16b of bracket 16. Clearance is provided, as at 32, between the inner sides of yokes 21 and the outer sides of bracket 16. Clearance is also provided, as at 33, between the guide block 27 and the adjacent edge of the bracket 16.

A socket-die *a* is fitted on the top face 20 on the thrust-receiving end of the arm 16b of bracket 16 and comprises a flange *a'* which is adapted to abut against said face 20. An opening $a^2$ extends vertically through the arm 16b for the punch 29 which passes through the socket in the die *a* which coacts with the punch to pierce a plate. The socket in the die *a* and the ram 29 which functions as a punch when used with a socket-die, are co-axial and the compression faces of the punch and the die *a* and between the latter and face 20 of arm 16b are parallel. A characteristic of this construction is that the ram or tool 29 is supported by the arms 23 of the rigid yokes 21 which are fixedly secured to the thrust-receiving end of the arm 16b of the bracket 16 and the socket-die is rigidly supported by said end of said thrust-receiving arm, so that when the pressure exerted by the punch during a punching operation is sufficient to produce a deflection in the connecting bend between the arms of the bracket 16, the socket-die and the punch will both be shifted together and the normal co-axial relation of the punch and the socket in the die and the parallelism of the compression faces on the punch and on the die will be maintained.

In the use of the unit, it will be manually shifted, which may be done by grasping the handle 13 in one hand and the yokes 21 in the other hand, to position the work between the end of arm 16b and the ram. The pneumatic device will then be operated under control of lever 14 to impart a driving stroke to the ram 29. The metal will be pierced between the compression faces on the ram and the socket-die on the end of the thrust-receiving arm 16b. In practice it is desired to avoid excessive weight in the squeezer yoke in its entirety because of the necessity of manually shifting it to and from the work. The force required to pierce the metal, the composition of which may vary in hardness, is sometimes sufficient to cause the pressure against the end of the thrust-receiving arm 16b to bend the bracket 16 between the arm 16b and the arm 16a which is rigidly secured to the frame 10. When this bending occurs, the arm 16b would be deflected so its compression face 20 will be misaligned or shifted out of parallelism with the normal plane of the compression face on the ram or so it will not be perpendicular to the prolongation of the normal position of the axis of the ram when the ram is supported in the arm 16a of bracket 16 or in the frame 10. When this bending occurs in my construction, the yokes 21, block 27 and the ram 29 will be conjointly shifted or deflected, the parallelism between the compression faces on the ram, and the socket-die will be maintained and the axis of the ram will remain perpendicular to the compression faces on the die and the face 20 on arm 16b and coaxially aligned with the socket in the die *a*. The ram will not be subjected to injurious stresses and the stress of compression of the metal at the point of piercing will be distributed as desired between the compression faces notwithstanding the bending which has occurred in the bracket 16, and precision in the holes in the work will be achieved.

In Figs. 6 and 7, the invention is illustrated for use in upsetting rivets. In this form of the invention, the stem 34 of a rivet-set 35 fits in the opening $a^2$ in the thrust-receiving arm 16b. The set has a flange which abuts against the top face 20 of the arm 16b. The rivet-set is adapted to hold a rivet 36 which will be upset by the ram 29 and is substituted for the socket-die *a*. In this modification the compression faces of the rivet-set and between the rivet-set and arm 16b, and the compress on face on the ram or riveting tool 29 will be conjointly shifted or deflected to maintain their normal relationship when the compression forces are sufficient, to produce a bend in the bracket 16 between its arms, as before described.

Preferably, dual yokes are provided for supporting the ram from the end of the thrust-receiving arm to insure against transverse movement of the ram, but it will be understood that in some instances a single yoke may suffice.

The yoke structure is adapted to be attached to the frame of a portable power unit and may be applied to power units as a substitute for brackets without yokes.

The invention also exemplifies a yoke structure which is adapted for different work, such as piercing and riveting. The yoke structure is simple in construction and efficient in operation, particularly where, as in aircraft, precision is required in the work performed by the tools.

The invention is not to be understood as restricted to the details set forth, since these may be modified within the scope of the appended claims without departing from the spirit and scope of the invention.

Having thus described the invention, what I claim as new and desire to secure by Letters Patent is:

1. The combination with a portable frame, power operable means mounted in and portably supported by the frame, for operation at one side of the work, a portable substantially C-shaped bracket having one of its members connected to and supported by the frame and a thrust-receiving member on the opposite side of the work, of a portable rigid yoke comprising a member having an end portion to which the thrust-receiving member of the bracket is rigidly secured and a member extending to the power side of the work, and a ram operable by said power means for operation on the work and operably supported by the member of the yoke on the power side of the work, the yoke being adapted to support the ram for maintaining normal working relationship between the ram and the thrust-receiving member of the bracket when pressure from the ram causes deflection in the bracket.

2. The combination with a portable frame, a power operable stem mounted for rectilinear sliding movement in the frame and portably supported by the frame for operation at one side of the work, a portable substantially C-shaped bracket having one of its members connected to and supported by the frame and a thrust-receiving member on the opposite side of the work, of a portable rigid yoke comprising a member having an end portion to which the thrust-receiving member of the bracket is rigidly secured and a member extending to the power side of the work, and a portable ram operable by said power means for operation on the work and slidably supported in the member of the yoke on the power side of the work, the yoke being adapted to support the ram for maintaining normal working relationship between the ram and the thrust-receiving member of the bracket when pressure from the ram causes deflection in the bracket.

3. The combination with a portable frame, power operable means mounted in and portably supported by the frame for operation at one side of the work, a substantially C-shaped bracket formed of a single solid narrow wall with flat side-faces, having one of its members connected to and portably supported by the frame and a thrust-receiving member on the opposite side of the work, of a portable yoke, having a pair of sides in close relationship with the side-faces of the bracket, each comprising a member having an end portion to which is rigidly secured the thrust-receiving member of the bracket and a member extending to the power side of the work, and a portable ram operable by said power means for operation on the work and operably supported by the member of the yoke on the power side of the work, the yoke being adapted to support the ram for maintaining normal working relationship between the ram and the thrust-receiving member of the bracket when pressure from the ram causes deflection in the bracket.

4. The combination with a portable frame, a power operable stem mounted in and portably supported by the frame for operation at one side of the work, a portable substantially C-shaped bracket formed of a single narrow solid wall with substantially flat side-faces, having one of its members connected to and portably supported by the frame and a thrust-receiving member on the opposite side of the work, of a portable rigid yoke having a pair of sides in close relationship with the side-faces of the bracket, each side comprising a member having an end portion rigidly secured to the thrust-receiving member of the bracket and a member extending to the power side of the work, a block fixedly secured between the ends of the yoke sides on the power side of the work, and a ram slidable in and extending through said block and engageable by said stem for operation of the work, the yoke being adapted to support the ram for maintaining normal working relationship between the ram and the thrust-receiving member of the bracket when pressure from the ram causes deflection in the bracket.

5. The combination with a portable frame, a power operable stem slidably mounted in and portably supported by the frame for operation at one side of the work, a portable substantially C-shaped bracket formed of a single narrow solid wall with substantially flat side-faces, having one of its members connected to and portably supported by the frame and a thrust-receiving member on the opposite side of the work, of a portable rigid yoke having a pair of sides in close relationship with the side-faces of the bracket, each side comprising a member having an end portion rigidly secured to the thrust-receiving member of the bracket and a member extending to the power side of the work, a block fixedly secured between the ends of the yoke-sides on the power side of the work, a ram slidable in and extending through said block and engageable by said stem for operation on the work, the yoke being adapted to support the stem for maintaining normal working relationship between the stem and the thrust-receiving member of the bracket when pressure from the ram causes deflection in the bracket, and a spring between the ram and the block for retracting the ram.

6. The combination with a portable frame, a power operable stem slidably mounted in and portably supported by the frame for operation at one side of the work, a portable substantially C-shaped bracket formed of a single narrow solid wall with substantially flat side-faces, having one of its members connected to and portably supported by the frame and a thrust-receiving member on the opposite side of the work, of a portable rigid yoke having a pair of sides in close relationship with the side-faces of the bracket, each comprising a member having an end portion rigidly secured to the thrust-receiving member of the bracket and a member extending to the power side of the work, a block fixedly secured between the ends of the yoke-sides at their ends on the power side of the work, and a riveting tool slidable in and extending through said block and operable by said stem for operation on the work, and an anvil carried by the end of the thrust-receiving member of the bracket, the yoke being adapted to support the ram for maintaining normal working relation between the ram and the thrust-receiving member of the bracket when pressure from the ram causes deflection in the bracket.

7. A unit for attachment to a portable frame carrying power means comprising a portable substantially C-shaped bracket having one of its members provided with means for detachably connecting it to and supporting it from the frame and an integral thrust-receiving member on the opposite side of the work, a substantially C-shaped portable yoke comprising sides in close relation to the bracket, each side having a member with an end portion to which the thrust-receiving member of the bracket is rigidly secured and a member extending to the power side of the bracket, a tool slidably mounted between the ends of the yoke at the power side and a co-acting die carried by the end of the member of the bracket at the thrust side of the work, the yoke being adapted to support the tool for maintaining normal work relationship between the tool and the die when pressure from the tool causes deflection in the bracket.

8. A unit for attachment to a portable frame carrying power means comprising a portable substantially C-shaped solid narrow bracket having one of its members detachably connectable to and adapted to be portably supported by the frame, and an integral thrust-receiving member on the opposite side of the work, a substantially C-shaped portable yoke comprising sides in close relation to the sides of the bracket, each side having a member with an end portion to which the thrust-receiving member of the bracket is rigidly secured and a member extending to the power side of the bracket, a block fixed to the ends of said yoke members adjacent the power side of the bracket between the yoke sides, a tool slidably mounted in the block for operation by the power means, a spring between the tool and the block for retracting the tool and a co-acting die carried by the end of the member of the bracket at the thrust side of the work, the yoke being adapted to support the tool for maintaining normal work relationship between the tool and the die when pressure from the tool causes deflection in the bracket.

9. A unit attachment to a portable frame carrying power means comprising a portable substantially C-shaped bracket having a solid narrow wall and one of its members detachably connectable to and adapted to be portably supported by the frame, and an integral thrust-receiving member on the opposite side of the work, a substantially C-shaped portable yoke comprising sides in close relation to the sides of the bracket, each side having a member with an end portion to which the thrust-receiving member of the bracket is rigidly secured and a member extending to the power side of the bracket, a block fixed to the ends of said yoke members adjacent the power side of the bracket and between the yoke-sides, a riveting tool slidably mounted in the block for operation by the power means, a spring between the tool and the block for retracting the tool, and an anvil carried by the end of the member of the bracket at the thrust side of the work, the yoke being adapted to support the tool for maintaining normal work relationship between the tool and the anvil when pressure from the tool causes deflection in the bracket.

HARVEY S. SINES.